(12) United States Patent
Höcks et al.

(10) Patent No.: US 12,194,895 B2
(45) Date of Patent: Jan. 14, 2025

(54) FULL SEAT PAN WITH TILT FUNCTION

(71) Applicants: Ningbo Geely Automobile Research & Development Co., Ltd., Ningbo (CN); Zhejiang Geely Holding Group Co., Ltd., Zhejiang (CN)

(72) Inventors: Johan Höcks, Varberg (SE); Glenn Edsbäcker Sjö, Gothenburg (SE)

(73) Assignees: Ningbo Geely Automobile Research &Dev. Co., Ltd., Ningbo (CN); ZHEJIANG GEELY HOLDING GROUP CO., LTD., Zhejiang (CN)

( * ) Notice: Subject to any disclaimer, the term of this patent is extended or adjusted under 35 U.S.C. 154(b) by 115 days.

(21) Appl. No.: 17/872,057

(22) Filed: Jul. 25, 2022

(65) Prior Publication Data
US 2022/0371479 A1  Nov. 24, 2022

Related U.S. Application Data

(63) Continuation of application No. PCT/CN2020/141735, filed on Dec. 30, 2020.

(30) Foreign Application Priority Data

Feb. 4, 2020 (EP) .................................... 20155303

(51) Int. Cl.
*B60N 2/18* (2006.01)
*B60N 2/68* (2006.01)
*B60N 2/70* (2006.01)

(52) U.S. Cl.
CPC ........... *B60N 2/1839* (2013.01); *B60N 2/686* (2013.01); *B60N 2/7011* (2013.01)

(58) Field of Classification Search
CPC B60N 2/1839; B60N 2/4221; B60N 2/42718; B60N 2/42763; B60N 2/686
See application file for complete search history.

(56) References Cited

U.S. PATENT DOCUMENTS

| | | | |
|---|---|---|---|
| 4,583,781 A * | 4/1986 | Hatsutta | B60N 2/1839 297/312 |
| 4,711,497 A | 12/1987 | Kazaoka | |
| 9,402,480 B2 | 8/2016 | Holzhueter | |
| 10,081,281 B2 | 9/2018 | Römer | |

(Continued)

FOREIGN PATENT DOCUMENTS

| | | |
|---|---|---|
| CN | 101172467 A | 5/2008 |
| CN | 202686028 U | 1/2013 |

(Continued)

OTHER PUBLICATIONS

International Search Report from International Application No. PCT/CN2020/141735, mailed on Apr. 1, 2021, 2 pages.

(Continued)

*Primary Examiner* — David R Dunn
*Assistant Examiner* — Tania Abraham
(74) *Attorney, Agent, or Firm* — Tucker Ellis LLP (57) ABSTRACT

A seat pan for a vehicle seat. The seat pan includes a rear portion and a front portion. The seat pan includes a flexible area arranged between the rear portion and the front portion, said flexible area enabling the front portion to be arranged in a tilted state relative to the rear portion and wherein the seat pan is formed in a single piece.

19 Claims, 4 Drawing Sheets

(56) References Cited

U.S. PATENT DOCUMENTS

| | | | |
|---|---|---|---|
| 2002/0145321 A1* | 10/2002 | Brightbill | B60N 2/50 |
| | | | 297/312 |
| 2007/0222270 A1 | 9/2007 | Combest | |
| 2009/0015043 A1 | 1/2009 | Macht | |
| 2013/0009435 A1* | 1/2013 | Westerink | B60N 2/1839 |
| | | | 297/313 |
| 2014/0306504 A1* | 10/2014 | Boy | B60N 2/62 |
| | | | 297/313 |
| 2015/0108804 A1 | 4/2015 | Meister | |
| 2018/0111531 A1 | 4/2018 | Sasaki | |
| 2020/0254911 A1* | 8/2020 | Line | B60N 2/02246 |

FOREIGN PATENT DOCUMENTS

| | | | |
|---|---|---|---|
| CN | 103522923 A | 1/2014 | |
| CN | 203410340 U | 1/2014 | |
| EP | 0242140 A2 | 10/1987 | |
| JP | 56108750 U | 8/1981 | |
| WO | 03063650 A2 | 8/2003 | |
| WO | 2004039624 A1 | 5/2004 | |
| WO | 2015081419 A1 | 6/2015 | |
| WO | WO-2016113359 A1 * | 7/2016 | B60N 2/68 |

OTHER PUBLICATIONS

European Search Report from corresponding European Patent Application No. 20155303.9, mailed on Aug. 19, 2020, 9 pages.

* cited by examiner

FULL SEAT PAN WITH TILT FUNCTION

RELATED APPLICATION DATA

This application is a continuation of International Patent Application No. PCT/CN2020/141735, filed Dec. 30, 2020, which claims the benefit of European Patent Application No. 20155303.9, filed Feb. 4, 2020, the disclosures of which are incorporated herein by reference in their entireties.

TECHNICAL FIELD

The present disclosure relates generally to the field vehicle seats and seat pans. In particular, it relates to seat pans covering a whole seat area, i.e. a full seat pan for a vehicle seat.

BACKGROUND

Conventional seat pans typically cover half the seating structure of a vehicle seat framework. It is typically located in the frontal area of the seat frame and serves to support a seat cushion when the complete vehicle seat is assembled. The half seat pan usually enables a tilting function by being able to tilt around its rear attachment points (rear being in a direction facing a back rest of the vehicle seat). The originating point of the tilt typically is located a couple of centimeters in front of the measured hip-point of the seat when seen from the side (in a direction facing the front portion of the seat pan). Tilting at this point provides high comfortability to a passenger and further enables a passenger to better custom its seating preferences. A problem with the half seat pan is however that it only covers part of the seating framework and thus only supports part of the seat cushion. In order to provide adequate support for the seat cushion additional parts in the seat framework are typically needed which contribute to increased weight and complexity when assembling the car and car seat. However, by covering the whole seat frame with a seat pan, the tilt function which is enabled by the half pan tilt is lost, since the pivotal point is moved closer to the rear of the seat, i.e. closer to the back rest of the seat.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to provide a seat pan, which enables conditions for cost-efficient integration in a vehicle while still providing a tilt functionality.

According to a first aspect, this is achieved by a seat pan for a vehicle seat, wherein the seat pan comprises a rear potion and a front portion. The seat pan comprises a flexible area arranged between the rear portion and the front portion. The flexible area enables the front portion to be arranged in a tilted state relative to the rear portion. The seat pan is formed in a single piece.

One advantage with a seat pan according to the above is that a tilt function which corresponds to a half pan tilt function is enabled for a full seat pan, without resulting in a need for additional components or parts of either the vehicle frame supporting the pan or the seat pan itself.

In some embodiments, the flexible area extends in a transverse direction of the seat pan.

One advantage of the above embodiment is that the entire front portion of the seat pan is enabled to be tilted while not tilting the back portion which gives a higher degree of tilt in an upwards or downwards direction compare to conventional full seat pans.

In some embodiments flexible area extends over substantially the complete width of the seat pan.

One advantage of the above embodiment is that the entire front portion of the seat pan is enabled to be tilted while not tilting the back portion which gives a higher degree of tilt in an upwards or downwards direction.

In some embodiments, the flexible area has an elongated shape and extends along a substantially straight line.

One advantage of the above embodiment is that the entire front portion of the seat pan is enabled to be tilted while not tilting the back portion which gives a higher degree of tilt in an upwards or downwards direction.

In some embodiments, the flexible area extends perpendicular in relation to a forwards direction of the seat pan.

One advantage of the above embodiment is that the entire front portion of the seat pan is enabled to be tilted while not tilting the back portion which gives a higher degree of tilt in an upwards or downwards direction.

In some embodiments, the rear portion extends from a rear end of the seat pan to the flexible area and the front portion extends from the flexible area to a front end of the seat pan in a forwards direction of the seat pan.

One advantage of the above embodiment is that the entire front portion of the seat pan is enabled to be tilted while not tilting the back portion which gives a higher degree of tilt in an upwards or downwards direction.

In some embodiments, the rear portion extends from a right lateral end of the seat pan to a left lateral end of the seat pan and the front portion extends from the right lateral end of the seat pan to the left lateral end of the seat pan.

One advantage with the above embodiment is that the seat pan can be molded in one piece.

In some embodiments, the seat pan in the tilted state is tilted by an angle in relation to an un-tilted state.

One advantage with the embodiment above is that the full seat pan can be tilted upwards or downwards at different angles depending on a passenger preference.

In some embodiments, the flexible area is formed by a material weakening of the seat pan.

One advantage with the embodiments above is that the tilt is enabled without requiring two separate parts, which removes the need for additional components of the pan in order to realize the tilt and further support the seat pan.

In some embodiments, the flexible area is formed by at least one of a groove, and a folded wave formation.

One advantage with the above embodiment is that the tilt is enabled without requiring two separate parts, which removes the need for additional components to realize the tilt and further support the seat pan.

In some embodiments, the flexible area is arranged between a front edge of the front portion and half of a total length of the seat pan starting from the front edge.

One advantage with the above embodiment is that the pivotal point for the tilting function is located at a point where it provides comfort for a passenger by giving good support to the thighs when tilting the seat pan.

In some embodiments, the flexible area is located between one third and half of the total length of the seat pan, when starting from the front edge.

One advantage with the above embodiment is that the pivotal point for the tilting function is located at a point where it provides comfort for a passenger by giving good support to the thighs when tilting the seat pan.

Another advantage with the above embodiment is that a high degree of tilt is enabled in an upwards and downwards direction compared to the tilt of a conventional full seat pan.

In some embodiments, the front portion comprises openings defining a pivot axis, wherein the flexible area is arranged at the pivot axis.

One advantage with the above embodiment is that the pivotal point for the tilting function is located at a point where it provides comfort for a passenger by giving good support to the thighs when tilting the seat pan.

In some embodiments, the flexible area is elongated and extends along a straight line, which is in parallel with the pivot axis.

One advantage with the above embodiment is that the pivotal point for the tilting function is located at a point where it provides comfort for a passenger by giving good support to the thighs when tilting the seat pan.

According to one variant of the last-mentioned embodiment, the flexible area is positioned at a distance from the pivot axis.

One advantage with the above embodiment is that the pivotal point for the tilting function is located at a point where it provides comfort for a passenger by giving good support to the thighs when tilting the seat pan.

In some embodiments, the flexible area is positioned at a distance corresponding to 1-10 cm in a downwards direction towards a base of the seat pan from the openings defining the pivot axis.

One advantage with the above embodiment is that the pivotal point for the tilting function is located at a point where it provides comfort for a passenger by giving good support to the thighs when tilting the seat pan.

According to one alternative variant of the last-mentioned embodiment, the flexible area is positioned commensurate/overlapping with the pivot axis.

One advantage with the above embodiment is that the pivotal point for the tilting function is located at a point where it provides comfort for a passenger by giving good support to the thighs when tilting the seat pan.

Another advantage with the above embodiment is that a high degree of tilt is enabled in an upwards and downwards direction compared to the tilt of a conventional full seat pan.

In some embodiments, the flexible area is arranged at a distance in front of a Hip-point, H-point of the seat pan.

One advantage with the above embodiment is that the pivotal point for the tilting function is located at a point where it provides comfort for a passenger by giving good support to the thighs when tilting the seat pan.

In some embodiments, the seat pan is formed by reinforced plastic.

One advantage with the above embodiment is that the seat pan is low in weight and easy to manufacture e.g. by (injection) molding.

In some embodiments, the seat pan is formed by a polymer composite.

One advantage with the above embodiment is that the seat pan is low in weight and easy to manufacture e.g. by molding.

In some embodiments, the seat pan is formed by metal.

One advantage with the above embodiments is that the seat pan is durable and resistant to material weakening due to wear and tear.

In some embodiments, the flexible area is formed by a same material as the seat pan.

One advantage with the above embodiments, is that the entire seat pan can easily be manufactured in a single piece and possibly one molding or stamping step which reduces cost and complexity when producing/manufacturing the seat pan.

In some embodiments, the seat pan covers an entire cushion area of the vehicle seat. One advantage with the above embodiment is that the seat pan provides adequate support for the entire seat cushion and less parts are needed in the seat frame in order to support the cushion compared to when a half seat pan is used, which reduces cost and complexity when manufacturing vehicles and vehicle seats.

A second aspect is a vehicle seat comprising a seat pan according to the first aspect and a seat cushion arranged on top of the seat pan.

An advantage with the above aspect is that a lighter vehicle seat may be manufactured requiring less parts.

In some embodiments, the second aspect may share or have identical features as the first aspect.

Further features and advantages will become apparent when studying the appended claims and the following description, with reference being made to the accompanying drawings.

The person skilled in the art realizes that different features of different embodiments may be combined to create embodiments other than those described herein, without departing from the scope of the invention.

BRIEF DESCRIPTION OF THE DRAWINGS

With reference to the appended drawings, below follows a more detailed description of example embodiments. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Generally, all terms used herein are to be interpreted according to their ordinary meaning in the relevant technical field, unless a different meaning is clearly given and/or is implied from the context in which it is used.

Figure 1:
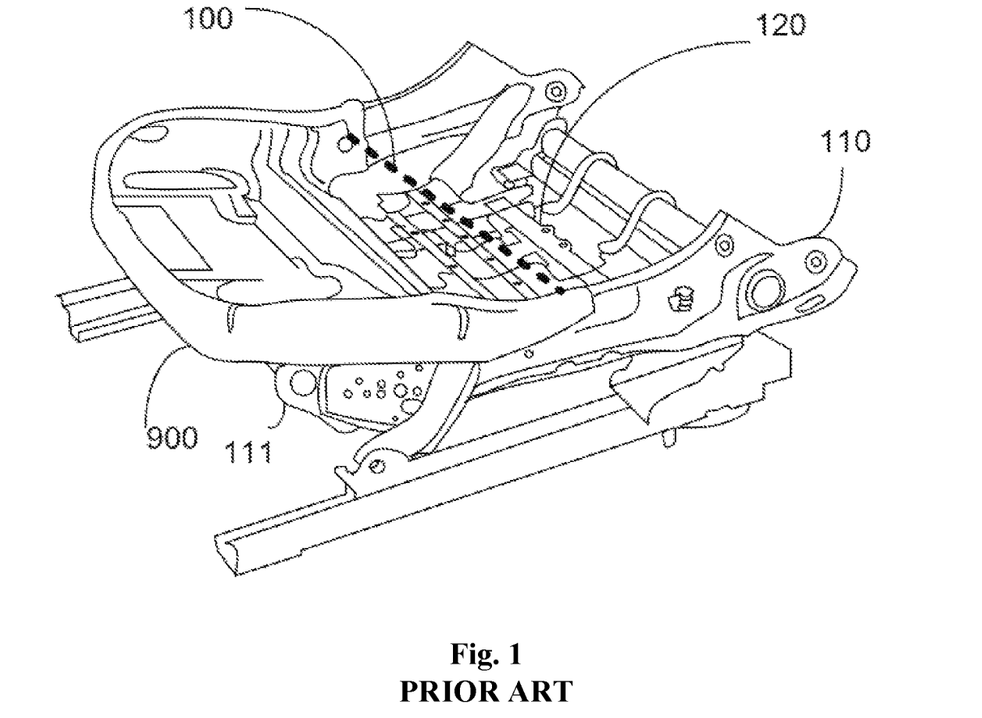
FIG. 1 is a schematic drawing illustrating a conventional half seat pan.

FIG. 1 illustrates a conventional half seat pan 900. The seat pan is attached to the seat frame 110 at a point which herein will be referred to as the half pan pivot axis, and is indicated by dashed line 100. The half pan 900 only covers the front portion of the seat frame 110. It should be noted that in this disclosure the term forward or front is taken to mean a direction pointing towards the steering wheel or pedals of a vehicle. Hence, something located at the front of the seat frame is typically close to the calves of a seated passenger. In similar manner, the term backward or rear is in this disclosure taken to mean a direction pointing towards the back seat of the vehicle seat. Hence, something located at the rear end of the seat frame is typically located close to a lower end of the back of a seated passenger.

Since only the front portion is covered, the tilt is flexible, but only the front part of a seat cushion will be supported by the seat pan. The tilt is furthermore supported by the tilt actuator 111. However, in order to avoid a passenger falling through the seat when seated, additional components 120 are needed in the seat frame in order to support the cushion and passenger while seated.

Figure 2A:
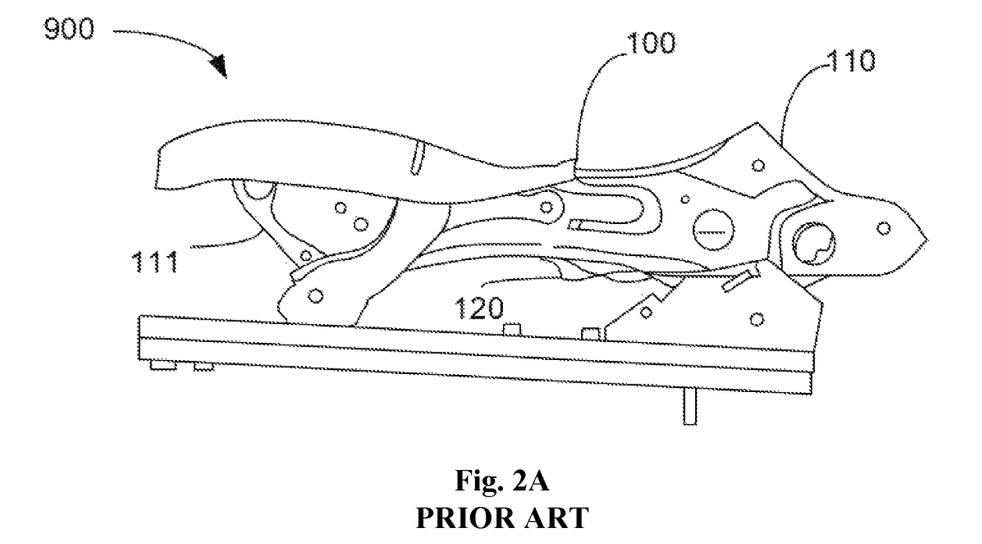
FIGS. 2A and 2B is are schematic drawings illustrating a conventional half seat pan in a un-tilted and tilted state.

FIG. 2A illustrates the half pan 900 as described in FIG. 1 in an un-tilted state. The seat pan 900 rests against the seat frame 110, and a passenger when seated would have its thighs and knees in a relatively even level.

Figure 2B:
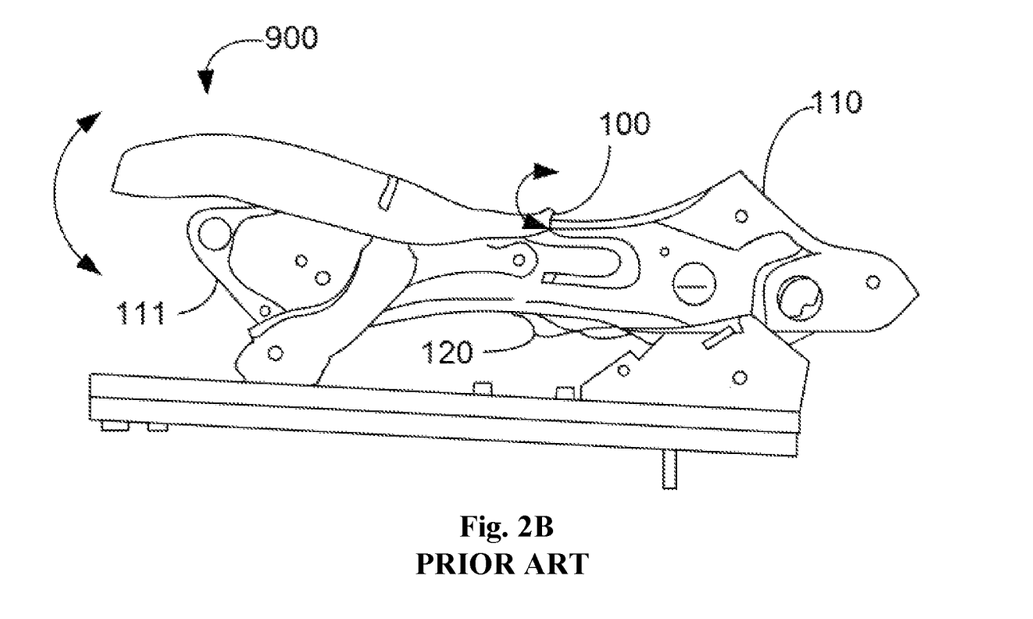

FIG. 2B illustrates the half pan 900 as described in the FIGS. 1 and 2A, but now in a tilted state. The angle of the tilt actuator 111 has been altered to allow the tilt. The illustrated tilt is in an upwards direction, but could also be in a downwards direction, as indicated by the double headed arrows. In the tilted state, the half pan is tilted at an angle compared to angle of the half-pan in the un-tilted state, and the knees and thighs of a passenger will be tilted upwards and supported by the half pan.

As noted, the tilt enables a user to find a comfortable seating position for thighs and knees by allowing a tilt of +/−8 degrees. The half pan may however present a drawback in that it does not necessarily provide sufficient support for the rear end passenger or cushion, which means that this support may have to be provided by the seat frame 110 instead. This typically leads to bulky, costly and sometimes complex implementations of the seat frame.

Today, there also exist full seat pans that covers most of or the entire seating area of the seat frame. However, conventionally when using full seat pans, the axis of the tilt is moved backwards to the rear attachment of the seat pan, e.g. by the rear lateral tube 7. This tilting axis cannot provide an as flexible tilt as that when the tilt is provided at the half pan pivot axis as described above. Hence, a tilt of +/−8 degrees is not possible for conventional full seat pans. This leads to that comfort for a passenger may be reduced when using a conventional full seat pan. It may also be more difficult to achieve the tilt if the seat pan is manually pressed upwards or downwards for the tilt (e.g. by adjusting the angle of the tilt actuator), especially when a passenger is seated in the seat. When the pivot axis is located at the rear lateral tubes the weight of the passenger will constitute a downward force acting against the tilting motion, especially if the tilt is enabled by manually pushing the seat just using one's hands.

Hence up until now, the use of full seat pans have provided less flexible seating, whereas the use of half seat pans have meant greater structure complexity of the seat frame as well as possibly resulting in additional weight in the seat frame structure.

Figure 3:
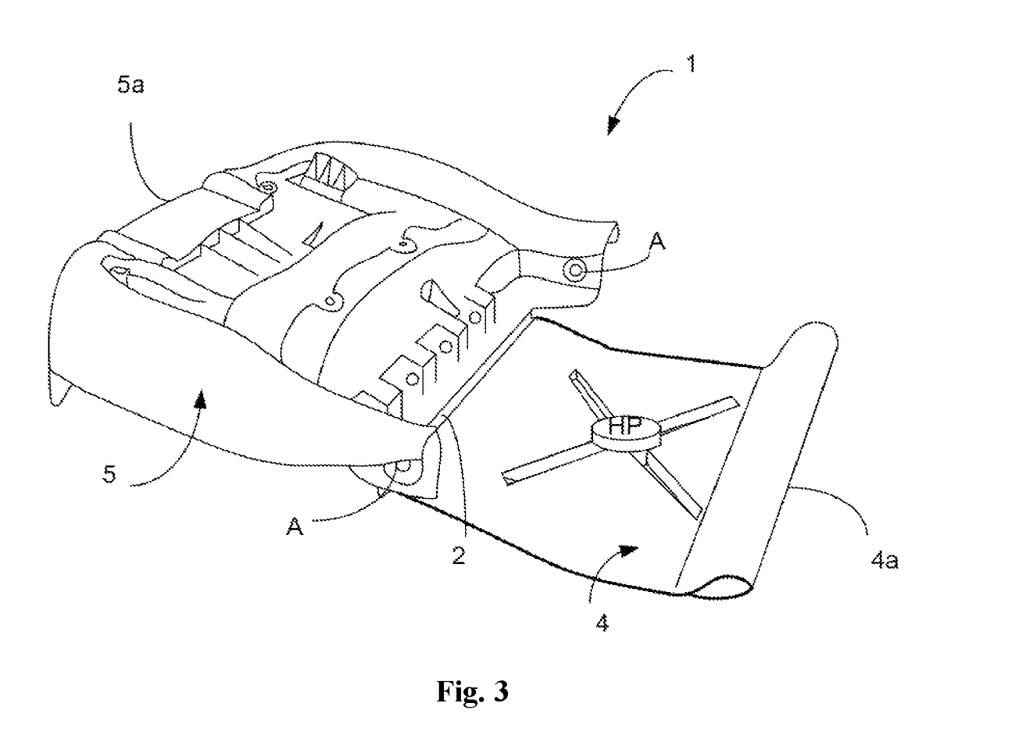
FIG. 3 is a schematic block illustrating an example seat pan according to some embodiments.

FIG. 3 illustrates a full seat pan according to some embodiments, which seat pan aims at providing good comfort to a passenger while reducing overall manufacturing costs.

In FIG. 3, a seat pan 1 for a vehicle seat 3 according to some embodiments can be seen. The full seat pan 1 comprises a rear portion 4 and a front portion 5. The seat pan 1 comprises a flexible area 2 arranged between the rear portion 4 and the front portion 5. The flexible area 2 enables the front portion 5 to enter a tilted state relative to the rear portion 4 and the seat pan 1 is formed in a single piece.

The rear portion may in some embodiments be attachable to a rear lateral tube 7. The front portion may further comprise a front edge 5*a* (or front end, the terms may be used interchangeably in this disclosure).

As can be seen in FIG. 3, the flexible area 2 may extend in a transverse direction of the seat pan.

In some embodiments, the flexible area 2 may extend over substantially the complete width of the seat pan. The flexible area 2 may further in some embodiments have an elongated shape and extend along a substantially straight line. In some embodiments, the flexible area 2 extends perpendicular in relation to a forwards direction of the seat pan.

As can further be seen in FIG. 3, in some embodiments the rear portion 4 extends from a rear end 4*a* of the seat pan to the flexible area 2 and the front portion 5 extends from the flexible area 2 to a front end 5*a* of the seat pan in a forwards direction of the seat pan.

In some embodiments, the rear portion 4 may further extend from a right lateral end of the seat pan to a left lateral end of the seat pan and the front portion 5 extends from the right lateral end of the seat pan to the left lateral end of the seat pan.

Hence, the seat pan is formed in a single piece by the front portion 5, flexible area 2 and rear portion 4. The flexible area may act as a separator of the front portion 5 and the rear portion 4 and may further enable the entire front portion 5 to tilt, while leaving the rear portion 4 in an un-tilted state. The seat pan further defines openings A and a hip point HP.

Figure 4:
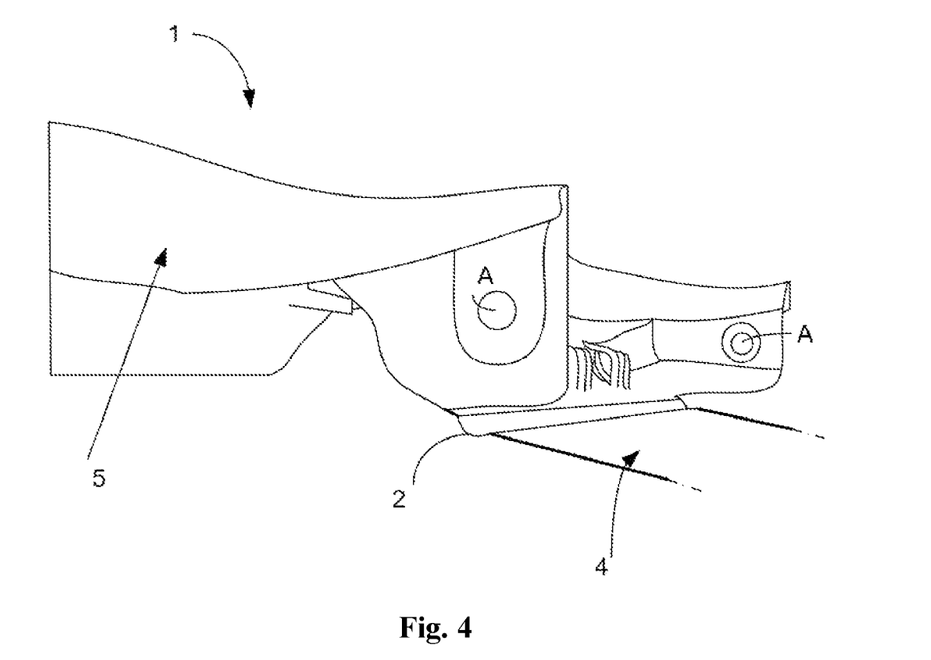
FIG. 4 is a schematic drawing illustrating a close up of an example seat pan according to some embodiments.

FIG. 4 illustrates a close up of the seat pan 1 according to FIG. 3. In FIG. 4 focus is made on the flexible area 2. The flexible area 2 may in some embodiments be formed by a material weakening of the seat pan 1. If, for example the full seat pan is made from plastic (or reinforced plastic), then the flexible area may provide an area where the layer of plastic is slightly thinner than in the rest of the seat pan which gives a higher elasticity in the flexible area compared to the rest of the seat pan. . This is illustrated in FIGS. 3 and 4 by the different weights of the line art representing the flexible area 2 and the rear portion 4 of the seat pan, the slightly thinner weight of the flexible area indicates a slightly thinner material than that of the rear portion. For the sake of simplicity, only the rear portion 4 has been illustrated with a thicker weight than that of the flexible area, however the thicker material also applies to the front portion 5. The flexible area 2 may typically be resilient and thus adapted to be bent and returned into an unbent state, thereby providing tilting in an upwards and/or downwards direction without breaking due to wear and tear.

In some embodiments, the flexible area 2 is formed by at least one of a groove, and a folded wave formation. In some embodiments, the material weakening is realized by forming the flexible area as a groove or other type of indention. For example, by folding the material of the seat pan, a folding edge is usually achieved and the edge is typically weaker/thinner in material compared to the rest of the unfolded material (compare with folding a piece of paper e.g.) while still retaining material strength. In some embodiments, the flexible area does not have to be formed by a material weakening. By forming the flexible area as an accordion but with rounded waves, the material can keep the same thickness as in the rest of the pan, but still enable a tilting function.

In some embodiments, the flexible area is formed by two or more apertures or perforations in the material. The front and rear portion may e.g. be connected by material bridges having a width of 1-3 cm and separated by air gaps having a width of 1-3 cm. Other sizes are contemplatable. The flexible area may e.g. be manufactured by means of three bridges separated by two large air gaps, or by several bridges separated by several small air gaps.

In order to provide comfortable support to a user, the pivotal point(i.e. the parallel axis of the flexible area 2), i.e. the point from where the tilting motion originates should preferably be located close to the half pan pivot axis as discussed above in conjunction with FIGS. 1-2a,b. The parallel axis of the flexible area 2 should preferably not be located farther away from the front edge 5a of the front portion than half the total length of the seat pan. In some embodiments it is preferable to locate the flexible area 2 between one third and half of the total length of the seat pan, in relation to the front edge 5a. The flexible area should preferably not be located closer to the rear edge 4a of the rear portion than to the front edge 5a of the front portion.

In some embodiments, the seat pan (and/or front portion of the seat pan) may comprise openings A (or other means) for attaching the seat pan to the seat frame. These openings A may be located in a position which corresponds to the attachment points of a half seat pan (compare with FIGS. 1-2B). The attachment points of the seat pan should preferably be located close to or at half of the total length of the seat frame, which hence corresponds to half of the total length of the full seat pan. The flexible area may then be positioned in parallel to the pivot axis defined by the openings and between the front portion and the back portion of the seat pan in order to connect the two portions. The flexible area may be elongated and further extend along a straight line, which is in parallel with the pivot axis.

The flexible area may furthermore be positioned at a distance from the pivot axis. The pivot axis defined (not shown) by the openings A may e.g. be located above the rear portion of the seat pan (as seen in FIGS. 3-6), and the flexible area is thus positioned below and in parallel to the pivot axis but at a distance which may span between e.g. 1-10 cm. Other distances are of course possible and depend on the design of the seat pan.

The position of the pivot axis of the flexible area does not have to correspond exactly to the pivot axis defined by the openings A (i.e. the flexible area does not have to be arranged directly underneath the openings). The Flexible area may e.g. be arranged 1-5 cm in front of (towards the front edge 5a) or behind of (towards the rear edge 4a) the pivot axis defined by the openings A.

In some embodiments, the front portion comprises openings A defining a pivot axis, wherein the flexible area is arranged at the pivot axis (e.g. directly underneath it, or directly at it).

Hence, according to one alternative variant of the last-mentioned embodiment, the flexible area is positioned commensurate/overlapping with the pivot axis.

In some embodiments, the flexible area is positioned at a distance corresponding to 5-15 cm in a downwards direction towards a base of the seat pan from the openings defining the pivot axis.

Another reference point for the location of the flexible area 2 may be the Hip-point (H-point) HP of the car seat. The hip-point (H-point) is a standardized point which is measured for all vehicle seats. Hence the flexible area may in some embodiments be arranged as an axis which extends from a first lateral edge to a second opposing lateral edge of the seat pan (and is thus parallel to the front end of the front portion as well as to a back end of the back portion) in front of the H-point HP (i.e. between the front edge 5a of the front portion 5 and the H-point HP) of the seat pan 1 and/or seat frame 11. It may not be preferable to arrange the flexible area directly at the H-point as this may put the tilt too far back to be comfortable for a passenger (the H-point may furthermore not always be located on the seat pan, it may e.g. be located above the seat pan, and the point should hence in this disclosure be seen as a mark for defining a possible location of the axis defining the flexible area). Hence, the flexible area should be arranged close to and in front of the H-point with the H-point closest to the rear portion. For example, the flexible area may be arranged about 3-20 cm in front of the H-point HP. Other distances to the H-point may be 5-15 cm or 10 cm. The distance may vary based on the design of the seat. Hence, in some embodiments, the flexible area 2 may be arranged between the front end 5a of the seat pan 1 and the H-point HP.

It should also be pointed out that the H-point is just a point and does not necessarily correspond to an axis. The H-point should hence be seen as a mark for determining where on the lateral edge of the seat pan the flexible area should originate from as well as where on the opposing lateral edge of the seat pan the flexible area 2 should end when seen from the side (it should further be noted that the terms lateral edge/end and opposing lateral edge/end may be used interchangeably with left lateral edge/end and right lateral edge/end or first lateral edge/end and second lateral edge/end in this disclosure).

This also applies to the above mentioned openings of the front portion of the seat pan.

The term H-point may in some cases be referred to as the Seat Reference Point, SRP.

Regardless of placement of the flexible area, it should as elaborated on above be positioned such that it extends longitudinally over the entire or at least ¾ of the width of the seat pan (i.e. from the first lateral edge to its opposing lateral edge of the seat pan).

Figure 5A:
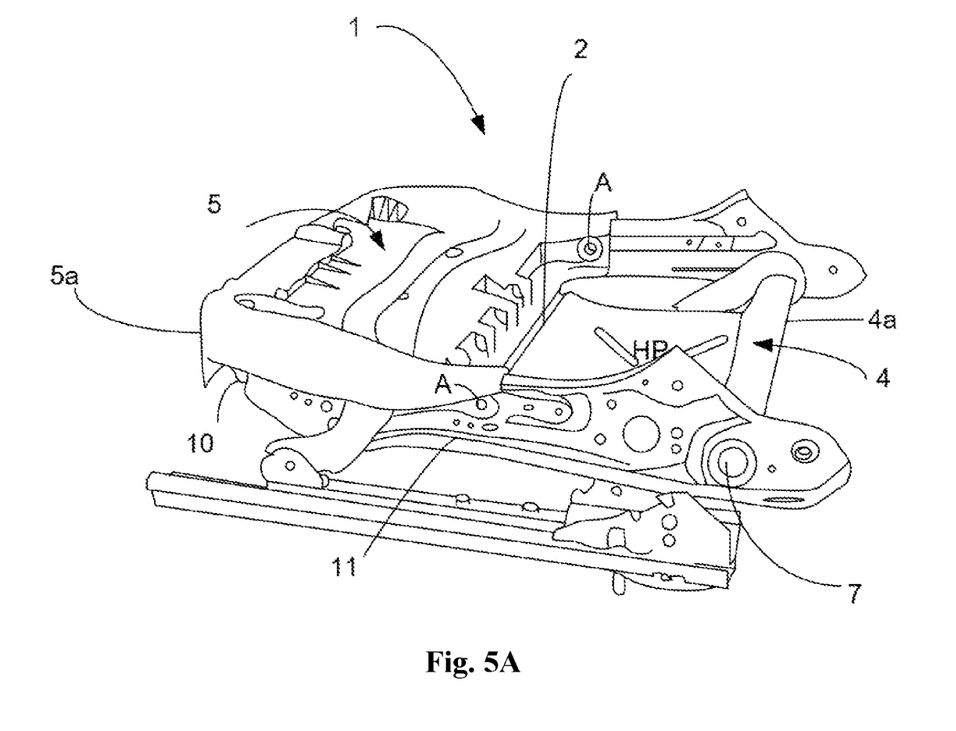
FIG. 5A and 5B are schematic drawings illustrating an example seat pan in an un-tilted and a tilted state according to some embodiments.
Figure 5B:
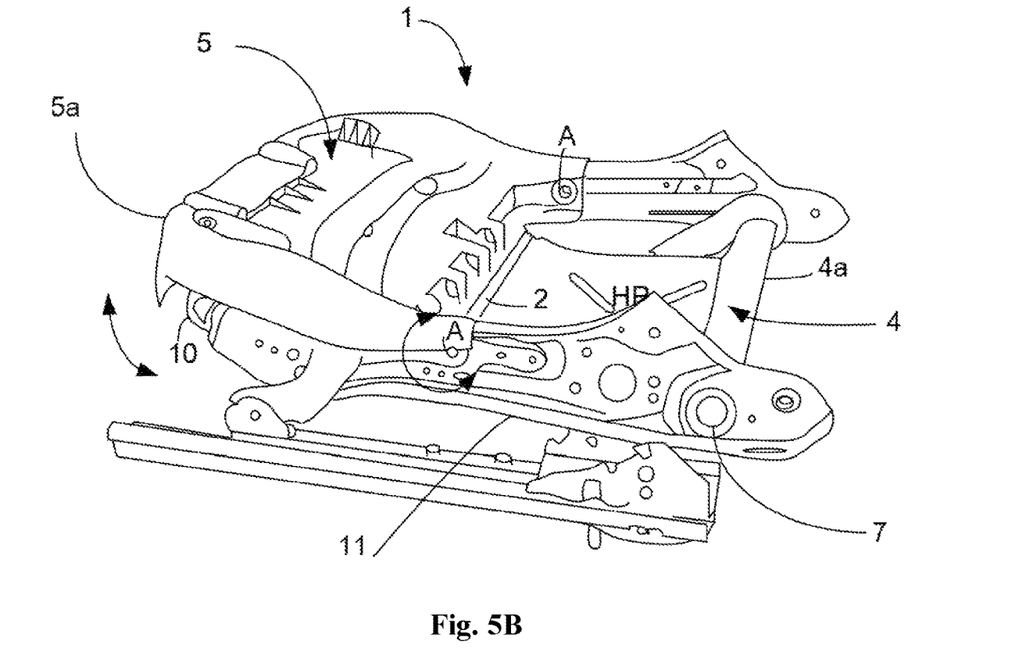

FIG. 5 illustrates the seat pan 1 according to FIGS. 3-4 in an un-tilted state arranged at a seat frame 11. In the un-tilted state the front portion of the seat pan (i.e. the part of the seat pan between the front end 5a and the flexible area 2) rests fully on the seat frame. As can be seen the rear end 4a of the seat pan 1 is attached to a rear lateral tube 7 of the seat frame 11. Hence, the seat pan covers the entire cushion area 8 (not shown in FIGS. 5A, 5B) and no additional components are needed in the seat frame 11 in order to provide adequate support for a seated person and seat cushion. In the un-tilted state, the thighs and knees of a passenger is relatively level to each other.

In some embodiments, the tilted state is tilted by an angle in relation to an un-tilted state. I.e. in the tilted state, the front portion 5 of the seat pan is tilted in relation to the rear portion 4 by e.g. changing the angle of the tilt actuator 10 on which the front portion of the of the seat pan rests. The angle may vary and may e.g. move by +/−8 degrees in relation to the un-tilted state. In some embodiments the upwards and downwards tilt does not have to be symmetrical. E.g., in some embodiments, the upwards tilt may be 0-8 degrees, or 2-4 degrees. The downwards tilt may in some embodiments be 0-2 degrees. In either case, tilt may be seen as when the front portion of the seat pan is rotated upwards or downwards by at least one degree compared to the rear portion.

As mentioned earlier the tilt may be achieved by a passenger manually using his or her hands in order to push the front portion upwards or downwards to a comfortable tilted position.

In some embodiments, the tilt may be achieved by means of an electrical motor e.g. controlling the angle of the tilt actuator 10 and/or controlling the angle of the seat pan.

In FIG. 5B the seat pan 1 has been tilted upwards. The tilt is indicated by the double headed arrows. The originating point of the tilt is at the flexible area 2, which leads to that the front portion 5 of the seat pan is tilted. In comparison to FIG. 5A, the front portion 5 of the seat pan is tilted upwards by a change of the angle of the tilt actuator 10 which pushes the front portion of the seat pan upwards. When seated, the thigs and knees of the passenger will not be level relative to each other. In an upwards tilt, the knees will be slightly higher than the thighs. In the down wards tilt, the knees will be slightly lower than the thighs.

As noted above, in some embodiments, the seat pan 1 is formed by reinforced plastic. Reinforced plastic may e.g. b a molded plastic seat pan supported from the outside by strengthening metal pieces.

In some embodiments, the seat pan 1 is formed by a polymer composite. A polymer composite may e.g. be carbon fibers, glass fibers or polypropylene.

By using some form of plastic material, the seat pan will be light in weight compared to e.g. a steel seat pan. Manufacture is furthermore simplified since the pan may be easily molded in a single piece.

Although plastic materials have many advantages, the invention is also applicable with other materials. For example, in some embodiments the seat pan is formed by metal. A metal seat pan is durable and resistant to wear and tear. Some metals may be more preferable than others. Steel or aluminum can e.g. be stamped in to desired shapes while still being durable and relatively low in weight. Stamped steel or aluminium enable deforming many times without resulting in material failure.

In some embodiments, the flexible area is formed by a same material as the seat pan. By forming the flexible area in the same material as the rest of the seat pan, the entire seat pan can be (injection) molded or stamped in one piece in one molding/stamping step which saves manufacturing time and costs.

In some embodiments, the flexible area is in a material different from the rest of the seat pan. The flexible area may e.g. be made of a different kind of plastic with better resilient characteristics compared to the rest of the seat pan which can be in relatively static material. E.g. if the seat pan is formed by injection molding, 2K injection molding may be used where the base is injection molded plastic that is over molded with e.g. a thermos plastic elastomer.

Furthermore, in some embodiments, an over molding process may be used where a stamped metal part is inserted into the injection molding tool and over molded by a thermoplastic material. Such an embodiment may be represented in FIGS. 3-6 by forming the front portion 5 and rear portion 4 in plastic and the flexible area 2 in metal or vice versa. In some embodiments, the front portion 5 may be formed by plastic whereas the rear portion 4 and the flexible area are formed by metal.

In an embodiment where seat pan is metal, the flexible area may hence be formed by a plastic material which is over molded or glued together with the metal parts to form a single piece.

Figure 6:
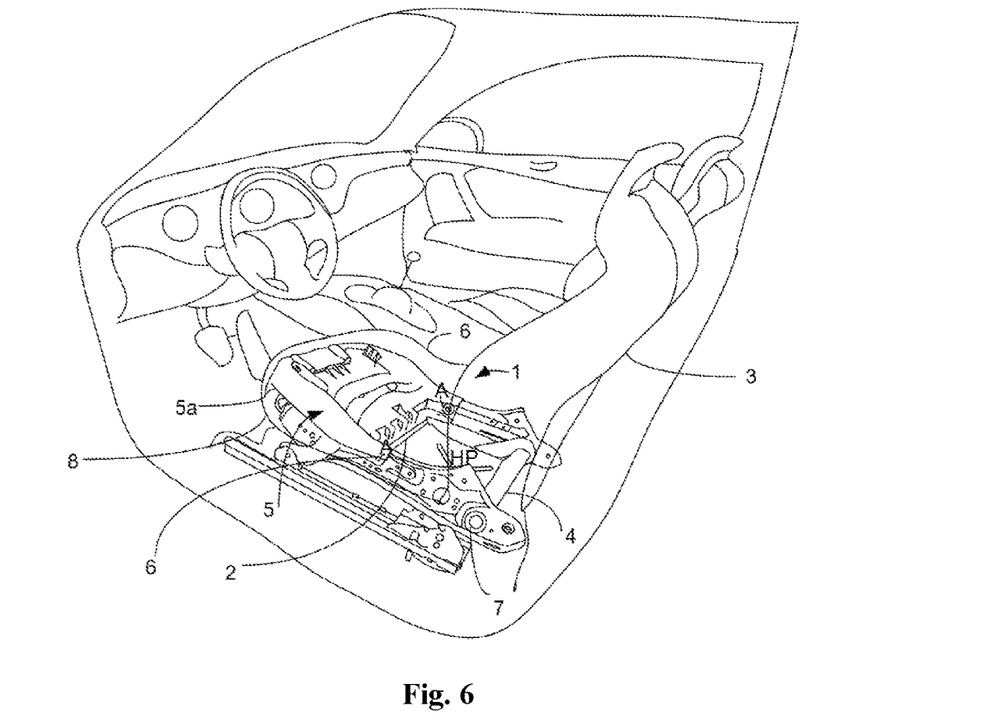
FIG. 6 is a schematic drawing illustrating an example deployment of a seat pan in a vehicle according to some embodiments.

FIG. 6 illustrates a scenario where the seat pan 1 according to any of the previous FIGS. 3-5 is deployed in the interior of a vehicle, and in particularly, comprised in a vehicle seat 3. The vehicle may e.g. be a car, truck, buss, tractor, airplane, helicopter, or any other type of suitable vehicle. The seat pan is covered by a cushion 6 (i.e. the seat pan supports the cushion from underneath) and in turn covers an entire lower part of the cushion area 8. Hence, in some embodiments, the seat pan 1 covers an entire cushion area 8 of the vehicle seat 3.

The seat pan of FIG. 6 is in the tilted state (compare to FIG. 5B), and extra support for the thighs of a passenger is enabled.

The seat pan described herein enables flexible tilt at an axis corresponding to a half pan pivot axis while still providing sufficient support for a cushion and seated passenger. It furthermore reduces the need for additional components in the seat frame for supporting the seat cushion. Manufacture of the seat pan as well as of the seat frame may hence be relatively cheaper and easier compared to manufacture of conventional seat pans and seat frames. The seat pan described herein may furthermore reduce the total weight of the car interior while still being durable and functional.

Reference has been made herein to various embodiments. However, a person skilled in the art would recognize numerous variations to the described embodiments that would still fall within the scope of the claims.

It should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

What is claimed is:

1. A seat pan for a vehicle seat that has a seat cushion and a seat frame that supports the seat pan, the seat pan comprising:
   a rear portion;
   a front portion; and a flexible area between the rear portion and the front portion, wherein the rear portion supports the seat cushion rearward of the flexible area and the front portion supports the seat cushion forward of the flexible area; and wherein the rear portion, the flexible area and the front portion are together of one piece construction and the flexible area connects the rear portion and the front portion so that, the front portion is repeatedly tiltable and un-tiltable with respect to the rear portion by pivoting about the flexible area, and wherein the front portion comprises attachment points at which the front portion attaches to the seat frame and the attachment points define a pivot axis of the front portion relative to the seat frame.

2. The seat pan according to claim 1, wherein the flexible area extends in a transverse direction of the seat pan.

3. The seat pan according to claim 1, wherein the flexible area extends over substantially the complete width of the seat pan.

4. The seat pan according to claim 1, wherein the flexible area has an elongated shape and extends along a substantially straight line.

5. The seat pan according to claim 1, wherein the flexible area extends perpendicular in relation to a forwards direction of the seat pan.

6. The seat pan according to claim 1, wherein the rear portion extends from a rear end of the seat pan to the flexible area and the front portion extends from the flexible area to a front end of the seat pan in a forwards direction of the seat pan.

7. The seat pan according to claim 1, wherein the rear portion extends from a right lateral end of the seat pan to a left lateral end of the seat pan and the front portion extends from the right lateral end of the seat pan to the left lateral end of the seat pan.

8. The seat pan according to claim 1, wherein the flexible area is formed by a weakening in the material of the seat pan.

9. The seat pan according to claim 1, wherein the flexible area is formed by at least one of a groove or a folded wave formation in the seat pan.

10. The seat pan according to claim 1, wherein the flexible area is arranged between a front edge of the front portion and half of a total length of the seat pan starting from the front edge.

11. The seat pan according to claim 1, wherein the seat pan is formed by reinforced plastic.

12. The seat pan according to claim 1, wherein the seat pan is formed by a polymer composite.

13. The seat pan according to claim 1, wherein the seat pan is formed by metal.

14. The seat pan according to claim 1, wherein the seat pan covers an entire cushion area of the vehicle seat.

15. A vehicle seat comprising a seat pan according to claim 1, and the seat cushion arranged on top of the seat pan.

16. The seat pan according to claim 1, wherein the attachment points are located at lateral sides of the front portion.

17. The seat pan according to claim 1, wherein the pivot axis is located above the rear portion.

18. The seat pan according to claim 1, wherein the flexible area is displaced from and parallel to the pivot axis of the front portion.

19. The seat pan according to claim 1, wherein the attachment points are openings in the front portion.

* * * * *